UNITED STATES PATENT OFFICE.

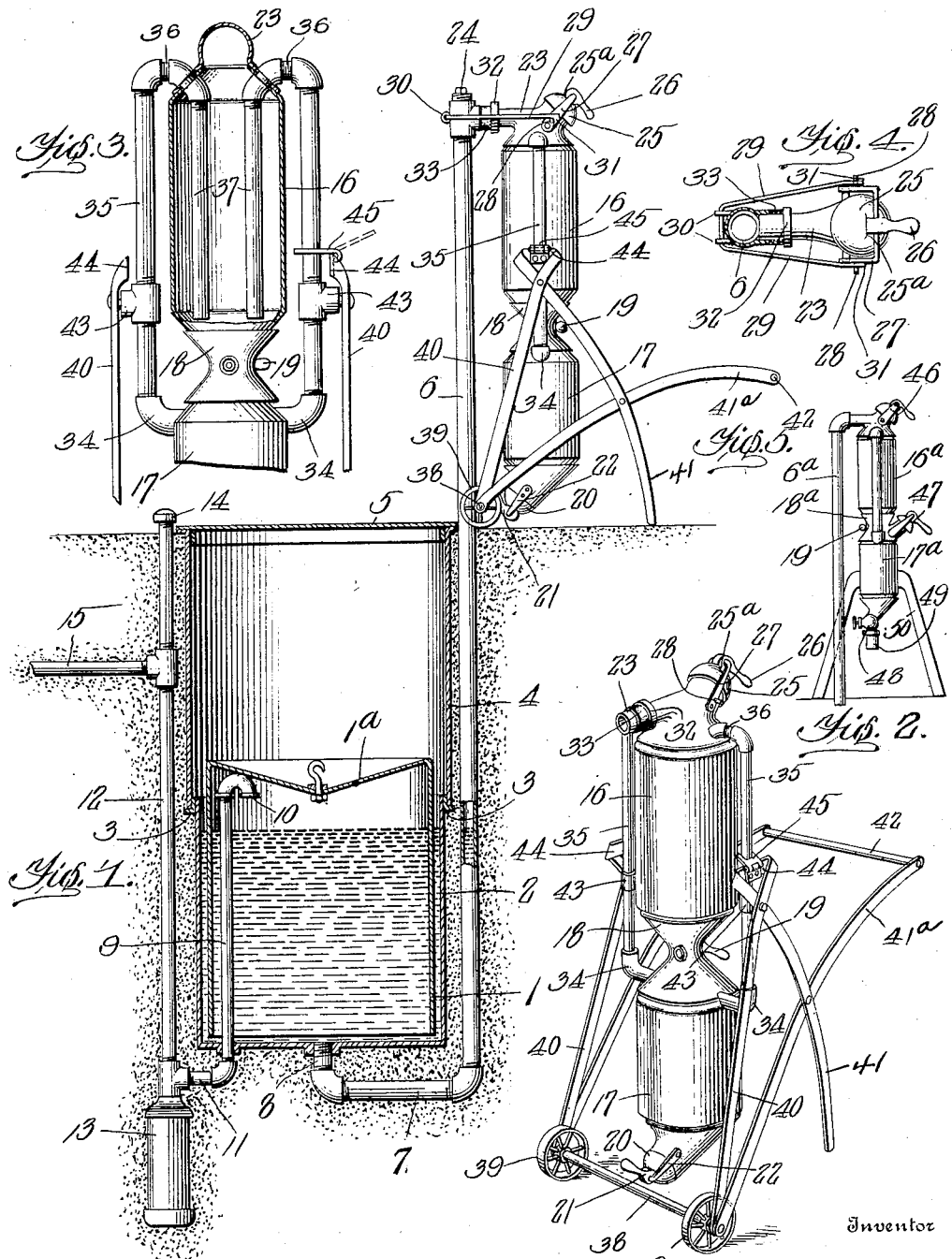

NILS A. RENSTROM, OF OMAHA, NEBRASKA, ASSIGNOR OF ONE-HALF TO EDMUND THORP, OF OMAHA, NEBRASKA.

ACETYLENE-GAS APPARATUS.

No. 897,491.    Specification of Letters Patent.    Patented Sept. 1, 1908.

Application filed April 30, 1906.   Serial No. 314,505.

*To all whom it may concern:*

Be it known that I, NILS A. RENSTROM, a citizen of the United States, residing at Omaha, in the county of Douglas, State of Nebraska, have invented certain new and useful Improvements in Acetylene-Gas Apparatus, of which the following is a specification.

This invention relates to acetylene gas apparatus, an object of the invention being to improve the mounting for and the construction of the gasometer.

Another object is to provide a generator detachably connected to the gasometer and mounted upon a truck forming part of the generator, whereby the generator may be conveyed bodily to a running stream or other refuse dump, thus dispensing with a drain pipe.

Still another object is to improve the construction of the generator.

Other and further objects will appear in the following description and will be more particularly pointed out in the appended claims.

In the drawing: Figure 1 is a sectional view of the gasometer and a side elevation of the generator connected to the gasometer; Fig. 2 is a perspective view of the generator; Fig. 3 is a sectional view of a portion of the generator, and Fig. 4 is a sectional view of the connection between the generator and the gasometer; and Fig. 5 is a side elevation of another embodiment of the generator.

Referring more particularly to the drawings, 1 indicates a rising and falling bell having a depressed concavo-convex top $1^a$ to support sand, dirt or other weights to give the required pressure to the gas. This bell is mounted in a vessel 2 which is provided with means (not shown in the drawings) for the ingress and egress of air to permit the rise and fall of the bell 1. Vessel 2 is in turn mounted in a pit formed in the ground and is provided with an annular flange 3 at the top of the side walls, formed of angle iron. Upon this angle iron is supported a tubular casing 4 which forms the walls of the pit above the vessel 1 and prevents the walls of the pit caving in. The top of the pit is closed by a cover 5. This form of pit is very cheap to construct as the vessel 2 braces part of the walls thereof.

The gas is generated at the top of the pit by a generator to be hereinafter more particularly described, and descends into the gasometer through a vertical inlet pipe 6 arranged to one side of the pit, connecting with a horizontal pipe 7 leading by pipe 8 into the bottom of vessel 2. The vessel 2 is filled with water and the water rises in the pipe 6 to a point on a level with the water in vessel 2 and forms a seal. The gas from the generator is of sufficient pressure to force the water into the gasometer from this seal during generation, thereby maintaining the seal clear of refuse. As the gas passes into the gasometer it is cleaned or washed and cooled by the water therein and passes above the water line.

A stand pipe 9 having a downwardly turned end 10, to prevent water from splashing therein, leads from above the water line through the bottom of the gasometer and is connected by horizontal pipe 11 to a vertical supply pipe 12 which is provided with a trap 13 at its lower end and leads to the top of the pit. Its upper end is closed by a removable cap 14 which, being directly above the trap 13, permits the trap to be cleaned. A supply pipe 15 leads from the vertical pipe 12 at a point below the upper end of the latter.

The generator may be of any type but I prefer the "water feed" type. The one shown comprises an upper water chamber 16 and a lower or carbid chamber 17 connected together by a reduced neck 18 having a turning plug 19 which controls the communication between the two chambers. The lower end of the carbid chamber is provided with an opening through which the carbid is placed therein and from which the refuse is discharged. This opening is closed by a cap 20 held in place by a cam lever 21 pivoted in a swinging yoke 22.

The upper end of the water chamber is provided with a lateral pipe or outlet 23 by which the generator is connected to the head 24 of the vertical pipe 6. An opening for filling the water chamber is also provided at the upper end of said chamber. This opening is closed by a cap 25 which is held in place by a cam lever 26 engaging in a notch $25^a$ in the cap and journaled on a yoke 27. The yoke 27 is pivoted to the generator on opposite sides of the opening and is provided with projections 28 on its opposite arms. These projections are adapted to be engaged by a U-shaped latch 29 pivoted to the pipe 6 at 30 and having hooks 31 at its ends to engage the projections 28 on the yoke 27. Before the cap is secured in place the laterally projecting outlet is fitted into pipe 6 and the yoke is moved so that the projections 28 are engaged by the hooks 31. If, after the hooks are engaged, the yoke is moved to a position to lock the cap 25, the generator is drawn tightly to the stand pipe. To prevent the escape of gas, the outlet pipe is provided with an annular flange 32 and between this flange 32 and the head 24 of the pipe 6, an elastic packing 33 is fitted.

The carbid chamber 17 is also connected with the water chamber 16 by two systems of piping leading from the upper part of the carbid chamber to the upper part of the water chamber and thence downwardly in the latter chamber below the water line, and comprising a pair of lateral pipes 34 leading from opposite sides of chamber 17, near the upper end thereof, a pair of vertical pipes 35 connected to pipes 34 at their lower ends, and a pair of lateral pipes 36 connecting the pipes 34 and vertical pipes 37 extending downwardly within and opening into the water chambers. By these piping systems, the gas generated by water dripping into the carbid chamber 17 through valve 19, passes first into the water of the generator where it is washed and cooled and from the generator it passes through the lateral outlet 23 of the generator into the inlet pipe 6 of the gasometer.

To permit the generator to be conveyed to the dump, it is mounted upon a truck which also forms a support for the generator when the latter is connected to the gasometer. This truck comprises an axle 38, supported by wheels 39 and having a pair of side frames connected thereto. Each side frame comprises a pair of crossed bars 40 and 41, the upper ends of which are connected by a cross-piece 44 and the lower end of one being connected to the axle and the other acting as a supporting leg, the crossed bars being connected together by a handle rod 41$^a$ which is also connected to the axle 38, the rods 41$^a$ being connected by a handle bar 42. The generator is journaled or pivoted to the side frames at the point where the bars 40 and 41 cross each other and for this purpose the vertical pipes 35 carry bearing pieces 43. To hold the generator against swinging, one of the cross pieces carries a swinging latch 45, which is recessed so that it may engage on opposite sides of the adjacent vertical pipe 35.

The generator is filled with water and with carbid before it is connected to the gasometer, the valve 19 being closed during the filling and the caps 20 and 25 being open during the filling of the respective chambers. When the carbid chamber is filled, the positions of the chambers 16 and 17, are reversed, that is, the generator is turned so that the carbid chamber is above the water chamber. After both chambers have been filled, the generator is connected to the pipe head 24, in the manner hereinbefore set forth, and the valve 19 opened to permit the water to slowly drop into the carbid chamber. As the gas is generated, it passes through the water in the water chamber, and thence to the gasometer through inlet pipe 6. After generation, the generator is disconnected from the gasometer and rolled to the dump where it is cleaned. It is again refilled for another generation.

In the embodiment of my invention shown in Fig. 5, I connect the generator permanently to the stand or inlet pipe 6$^a$ leading from the pit. The water chamber 16$^a$ when not connected with the water system of the city, is filled by removing closure 46, while the carbid chamber 17$^a$ is filled by removing the closure 47 in the reduced neck 18$^a$ connecting the water and the carbid chambers. To clean the generator, a valve 48 at the bottom of the carbid chamber is opened, and the refuse drawn off into a sewer or other suitable place of deposit. The generator is supported by a fixed frame 50.

One of the principal advantages in the use of my acetylene gas apparatus results from its adaptability to be placed out of doors in a cold climate without freezing thereby insuring safety against explosions. Another advantage resides in the ease with which it is cared for since in removing the refuse from the carbid chamber and in recharging the same, nothing is required except the manipulation of one cap, the charging of the carbid and the handling of the truck. There is, moreover, no odor brought into the house from the water in the seal. While the position of the bell 1 serves as a gage by which to judge when the apparatus needs refilling the uniform load thereon and the simplicity of the entire structure, insures economy in the manufacture and use of the gas. A further advantage is found in obviating the employment of a blow-off pipe and in consequence thereof, the prevention of occasional losses during "blow-off". In virtue of the simple construction and arrangement of the generating and storage elements it will be appreciated that the ever present liability of something going wrong in the use of automatic gas apparatus is very largely if not absolutely done away with in the apparatus of my disclosure. Not only is my apparatus adapted to use the large lump carbid which, as has been demonstrated contains a higher percentage of gas than does the finely powdered form, but there takes place therein no waste of gas due to the extra pressure attending each feed of carbid in the carbid-feed apparatus.

Having thus described my invention, what I claim and desire to secure by Letters Patent is:

1. In an acetylene gas apparatus, the combination with a pit, of a gasometer within the pit, a piping connected to the bottom of the gasometer and extending above the top of the pit; and a portable generator provided with means for attaching it to the piping, said piping being adapted to hold the portable generator rigid with the gasometer.

2. An acetylene gas apparatus comprising a pit; a gasometer arranged within the pit; a generator mounted upon trunnions above the pit and adapted to be turned into and out of generating position; and a piping adapted to hold the generator in its generating position and rigid with the gasometer.

3. An acetylene gas apparatus comprising a pit; a gasometer within the pit; a rigid piping extending upwardly from the gasometer and above the top of the pit; a trunnioned generator movable to and from the rigid piping; and a coupling on said piping whereby the generator may be secured thereto.

4. An acetylene gas apparatus comprising a pit; a gasometer arranged within the pit and provided with a rigid piping extending above the mouth of the pit; a portable reversible generator adapted to be connected with said rigid piping; and means for rigidly securing said generator to the piping.

5. The combination with the pit and the gasometer arranged within the pit; of a rigid piping connected to the gasometer and projecting above the pit; a support arranged above the pit; a generator journaled on the support to permit the filling and dumping of the generator; and means for coupling the generator to the rigid piping during the operation of the generator.

6. The combination with the gasometer, of a truck, a generator journaled on the truck to permit the dumping and the filling of the generator, means for holding the generator against swinging on its journals, and a detachable connection between the gasometer and the generator.

7. In an acetylene gas apparatus, the combination with the gasometer; of a generator provided with a detachable connection whereby it may be connected to and disconnected from the gasometer; a truck upon which the generator is reversibly trunnioned; and means connected with the gasometer whereby the generator may be maintained in generating position during the period it is connected with the gasometer.

8. In an acetylene gas apparatus, the combination with a gasometer, of a generator formed of rigidly connected water and carbid chambers trunnioned upon a truck, a detachable cap on the outer end of each of said chambers for the introduction of water and carbid, and means connected with the gasometer, whereby when the generator is connected up to the gasometer, the water chamber is maintained above the carbid chamber.

9. The combination with the gasometer, of the inlet piping thereto, a generator having an outlet adapted to be fitted to the inlet piping, a yoke pivoted to the inlet piping and carrying hooks, and a swinging yoke mounted on the generator, and carrying projections to be engaged by the hooks.

10. The combination with the gasometer, of the generator having a detachable connection therewith, a closure for the generator, means for securing the closure in place, and means for securing the generator to the gasometer controlled by the closure securing means.

11. The combination with the gasometer, of a truck, a generator journaled on the truck, and a detachable connection between the gasometer and the generator to permit the dumping and the filling of the generator.

The foregoing specification signed at Omaha, Nebraska, this 19th day of March, 1906.

NILS A. RENSTROM.

In presence of two witnesses—
G. M. MATTINGER,
SALMA ISMUSSEN.